Dec. 31, 1963 T. PETRIDES ETAL 3,116,040
SUPERSONIC ROTARY WING PLATFORM
Filed June 26, 1961 9 Sheets-Sheet 3

INVENTORS
THRACY PETRIDES
WILFRED P. STAPELFELD
BY
ATTORNEYS

Dec. 31, 1963 T. PETRIDES ETAL 3,116,040
SUPERSONIC ROTARY WING PLATFORM
Filed June 26, 1961 9 Sheets-Sheet 4

INVENTORS
THRACY PETRIDES
WILFRED P. STAPELFELD
BY
ATTORNEYS

3,116,040
SUPERSONIC ROTARY WING PLATFORM
Thracy Petrides, New York, and Wilfred P. Stapelfeld, Jamaica, N.Y., assignors to U.S. Industries, Inc., a corporation of Delaware
Filed June 26, 1961, Ser. No. 120,897
14 Claims. (Cl. 244—17.13)

This invention relates to a supersonic rotary wing platform which is to be used as a hovering platform and more particularly to a rotary wing platform in which the rotary blades are rigidly attached to a hub which is tiltable about a skew pin carried by a shaft mounted on the platform. This application is a continuation-in-part of our application Serial No. 22,594 filed May 4, 1960, now abandoned entitled "Supersonic Rotary Wing Platform."

A difficulty existing in contemporary high frequency communication systems utilizing microwave beams and the like is that the range of transmission between a receiver station and transmitter station is limited by the curvature of the earth. This is because high frequency waves of a microwave beam, etc. are projected in substantially straight lines so that the transmitter and receiver stations must be within "sight" of each other and not blocked by the curvature of the earth. It is known that the range between a transmitter and receiver can be increased by utilizing a relay station which is positioned at a considerable altitude above the surface of the earth so that there may be an unobstructed straight line between the relay station and the receiver and transmitter stations.

It has been proposed to relay signals via orbiting satellites. However, it is extremely expensive to orbit a satellite; the signal strength required is great because of the distance the satellite orbits about the earth and the signals are easily jammed. It has further been proposed to have a platform which may hover at a predetermined altitude above a selected spot on the earth's surface wherein the platform has rotating blades which provide a lifting force and which is powered by focused microwaves transmitted from power stations on the earth's surface. The power required, however, in such a system is extremely great and only a small percentage of the power transmitted could actually be focused and effectively utilized by the platform. Such a device is disclosed in Electronic Industries, April 1960, page 78.

We overcome the aforementioned difficulties of expense and inefficiency in utilization of power available to rotate lifting blades on a hovering platform by providing for a hovering platform wherein the rotor blades are rotated at supersonic tip speeds utilizing ramjets or rockets mounted on the tips of the blades.

In order to provide power for a platform which is to hover at altitudes 80,000–100,000 feet, it is necessary to utilize an engine or propulsive unit which will be able to operate in the rarified atmosphere. Conventional jet and internal combustion engines are inefficient at very high altitudes and provide little thrust as compared to the weight of the engine. Ramjet engines on the other hand, when operated at high velocities over Mach 1, are comparatively efficient when operated at high altitudes.

Further in order to provide sufficient lift at extremely high altitudes, it is necessary to utilize a very large airfoil or to have air pass over a smaller airfoil at a very high velocity. We, therefore, utilize in our platform rotor blades which may be rotated at tip speeds will over Mach 1 and which are powered by tip-mounted ramjets which may take advantage of the high tip speeds. Preferably, ramjets are used rather than rockets since fuel consumption and weight of fuel carried in the platform for a flight of given duration is less than when rockets are used since the fuel for ramjets does not include its own oxidizer as does rocket fuel.

Conventional cyclic control apparatus for changing the blades of the rotor as used on helicopters is not adaptable for use with rotors having very high tip speeds because of the high centrifugal forces which act on the blades and on the control apparatus and of the necessity of having a hub capable of withstanding high tension forces. We provide, therefore, for the blades of a rotor to be rigidly connected to a hub which eliminates the use of cyclic pitch control apparatus and which provides maximum strength in order to overcome the extreme centrifugal forces existing when the rotor blades and tip-mounted ramjets rotate at high speeds.

Control and stability of our platform is accomplished by mounting the hub so that it may tilt about a skew pin which is inclined to the longitudinal axis of two rotor blades which are mounted on diametrically opposite sides of the hub and which is carried on a rotatable shaft mounted on the vertical longitudinal axis of the platform. Further control is obtained by control surfaces carried on the platform and which are mounted in the downwash area of the rotor. The blades of such rotor will automatically change their angle of attack with respect to any cross-flow of air passing over the rotor plane to compensate for the lack of cyclic pitch control apparatus and make the above-mentioned control more effective.

A platform utilizing our invention is particularly adaptable as a communications relay station which is to hover at an altitude of 80,000–100,000 feet, as an early warning and surveillance device, as a meteoroligical station or as a command guidance and navigation station. As a data relay station, the platform may transmit data received from drone aircraft passing over enemy territory back to a ground station. As an early enemy warning and surveillance platform, the platform may carry radar, infrared scanners, or cameras to provide beyond-the-horizon early warning against ballistic missiles and low-flying enemy aircraft plus observation of ground targets many miles away from a ground station location. As a meteorological station, the platform may carry cloud cover sensors and perform astronomical observations. As a command guidance and navigation station, the platform may carry data relay equipment to extend the line of sight range of microwave baseline navigation equipment to drones or other devices operating over enemy territory.

The platform itself may carry altitude sensitive means whereby the rate of fuel flow to the ramjets or rockets may be controlled to regulate height of hovering by controlling the speed of rotation of the rotor. In addition, recovery equipment in the form of parachutes may be carried so that the platform may be lowered when the fuel carried is exhausted.

The platform may be positioned so that it will hover over a particular spot on the earth by utilizing tracking radar stations on the ground and servo-mechanisms responsive to receipt of a radar beam signal which may actuate the control surfaces carried on the body in the downwash area under the rotor to move the platform laterally with respect to the earth or to compensate for any cross-wind.

Another embodiment of our supersonic rotary wing platform utilizes a control fan which induces a flow of air in a shroud surrounding the lower part of the platform body and in which movable control vanes are mounted. The control vanes are moved by servo motors in turn controlled by signals received by gyroscopes or ground control stations. The supersonic rotor construction of this embodiment of our invention is the same as in the first described form of the invention.

Referring to the drawings in which a preferred embodiment of our invention is illustrated.

Figure 1:
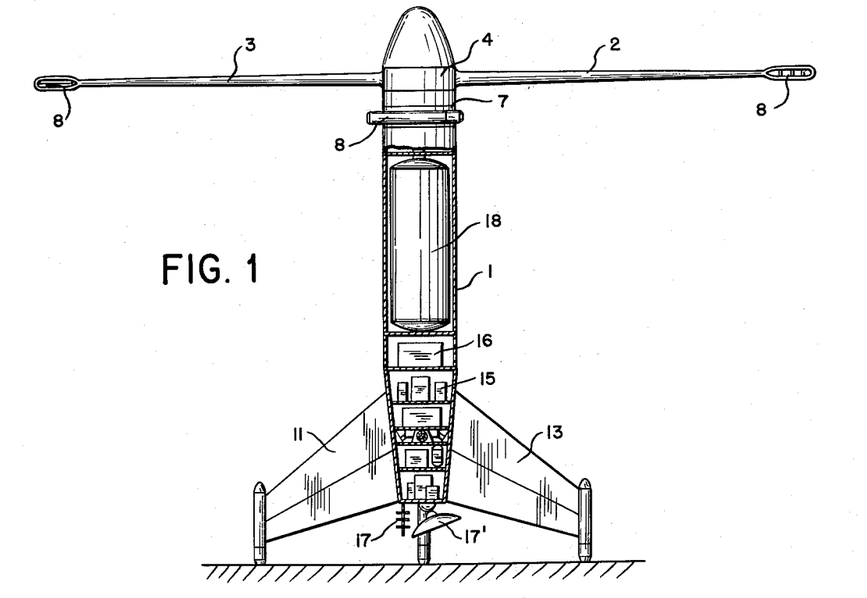
FIG. 1 is a sectional view of a platform shown resting in the upright position on the ground.

Referring to the drawings in which a preferred embodiment of our invention is shown, FIG. 1 illustrates a hovering platform comprising generally a symmetrical body portion 1 having mounted thereon an upper rotor assembly having blades 2 and 3 which are rigidly connected to a hub 4. A lower rotor assembly comprising blades 5 and 6 are likewise mounted on a hub 7 which in turn is connected to the body and rotates in a plane below the plane of rotation of the upper rotor.

All of the blades of both rotors have in the preferred embodiment of the invention ramjets 8 mounted on the blade tips in order to propel the rotor. In another form of the invention shown in FIG. 2a, rocket motors 9 may be mounted on the tips of the several blades to provide for rotation of the rotors instead of the ramjets.

Figures 2, 2A:
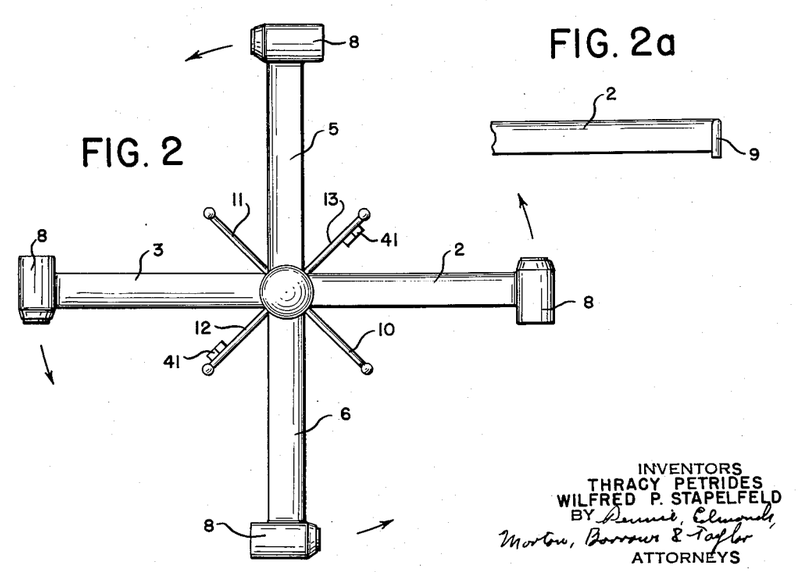
FIG. 2 is a plan view of the platform shown in FIG. 1 having ramjets as a porpulsion means.
FIG. 2a is a plan view of a portion of a rotor blade utilizing tip mounted rockets.

The body portion 1 also has symmetrically mounted thereon control surfaces 10, 11, 12 and 13 which either may be of a hinged construction or of a unitary construction wherein the surface pivots about a point to provide the forces necessary to maintain stability of the platform. The control surfaces are moved by servo-mechanisms 15 contained in the body which in turn may be controlled by an autopilot contained in the body and/or a radar beam command guidance receiver apparatus 16 which in turn receives signals through a receiving antenna 17 from command transmitter stations on the ground. The body portion also contains a conventional fuel tank 18 which carries the fuel necessary for operation of the ramjets or of the rockets as shown in FIG. 2a.

The antenna 17' serves as a means by which signals from a transmitter contained on a drone aircraft or ground station may be received by the platform and which are then transmitted by antenna 17 to a receiving station which lies beyond the earth's curvature with respect to the transmitting station.

Figure 3:
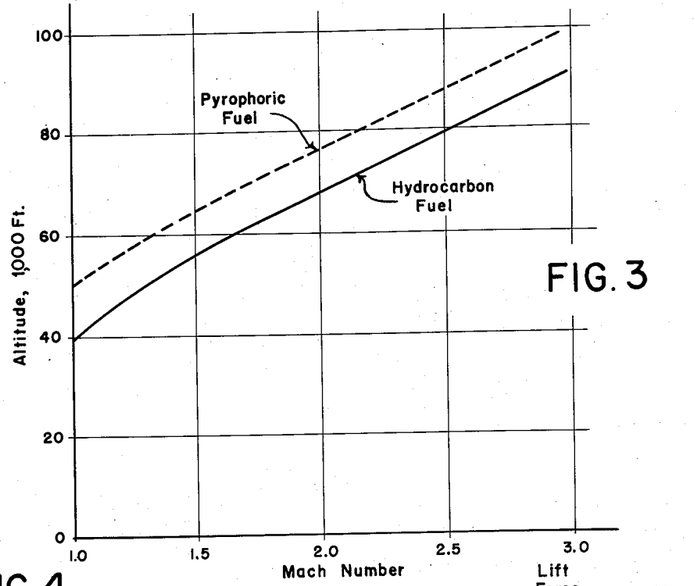
FIG. 3 is a graph illustrating performance of ramjet engines as a function of altitude and velocity.

In order to provide sufficient lift for supporting useful payloads for adequate hover durations and without going to unduly large rotor diameters, we use blades having airfoil sections which are capable of supersonic tip speeds. In particular, when tip mounted ramjets are used for propulsion units, supersonic tip speeds are desirable in order to insure proper ramjet combustion. FIG. 3 illustrates the required ramjet velocity for a typical ramjet propulsion unit as a function of operating altitude and type of available fuel. It is seen that for a rotor platform which is to hover at an altitude of 80,000 feet, a tip speed of approximately Mach 2.2 is required. In order to support the tip mounted ramjets at these speeds and to overcome the resulting high centrifugal forces, the rotor blades must have adequate strength in longitudinal tension. The resulting blade structural weight distribution tends to differ considerably from that of conventional helicopter blades and is very similar to that of high speed propellers.

Applying typical weights and forces to the hovering platform constructed according to our invention it may be calculated that if the blades are to have a tip speed of 2200 ft./sec. and an allowable blade working stress of 250,000 lbs./in.sq., 40 pounds of rotor structure are required per pound of ramjet power plant. Hence, if the ramjets weigh 30 pounds each, the total estimated rotor weight is on the order of 1200 pounds. At 80,000 feet the total lift generated by a 35 foot diameter rotor rotating at tip speeds on the order of Mach 2.2 and utilizing airfoil cross-sections of supersonic design, is approximately 3500 pounds. This leaves approximately 2300 pounds for the weight of the body, electronic apparatus and fuel which may be carried. Thus, it is seen that the rotor comprises approximately one-third the total weight of the platform. This large relative mass of the rotor as compared with the mass of the body portion of the platform and the rotor's high rotational speed induces a high rotational momentum which in turn results in the rotor having large gyroscopic forces.

Figure 4:
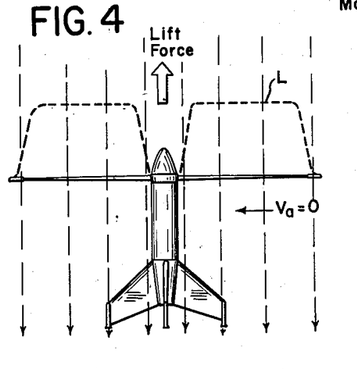
FIG. 4 is a side view of a platform illustrating lift distribution over the blades with no cross-wind.

In order to explain the aerodynamic forces operating on a single rotor having blades rigidly mounted to a hub, reference is made to FIG. 4 which illustrates a single rotor two-bladed hovering platform in which the lateral movement or cross-flow of air $V_a$ relative to the platform is zero. While only the forces on one rotor are discussed, the explanation applies equally as well to a platform having more than one rotor. It is obvious that since both the blades are moving at the same speed relative to the ambient air, the lift on each of the blades will be equal and the spanwise lift distribution, shown as dotted line L in FIG. 4, will be the same for each blade.

Figures 5, 7:
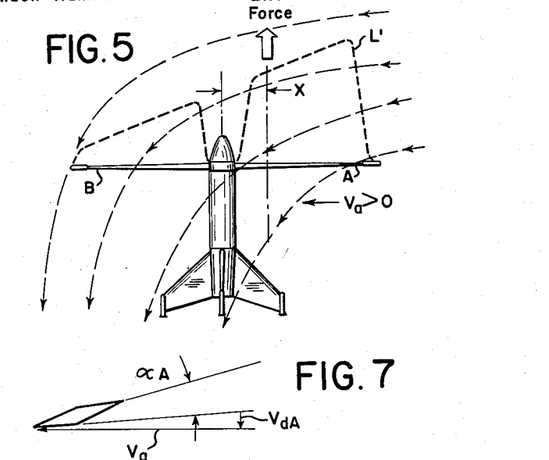
FIG. 5 is a view similar to FIG. 4 illustrating lift distribution over the blades as a result of cross-wind.
FIG. 7 is a schematic drawing of a blade section of the leading blade of FIG. 5.

In order to insure stability of the platform, it is important that the lateral aerodynamic forces available from the tail control surfaces which are located in the downwash portion under the rotor will counter-balance adverse destabilizing moments about the center-of-gravity of the platform due to shifts in the center-of-lift of the rotor caused by lateral or cross-flow of air cross the plane of the rotor as shown in FIG. 5 where $V_a>0$. Such cross-flow may result from lateral gusts or cross-winds when the platform is hovering above a fixed point on the ground, or when the platform maneuvers laterally in still air, either to change its position relative to a fixed point on the ground or in the course of stable oscillations while hovering.

The center-of-lift with respect to the plane of the rotor will shift due to cross-flow of air passing over the rotor plane to produce two effects: one causing a pitch-up moment, the other a rolling moment in a plane at right angles to the relative cross-wind vector.

Figure 6:
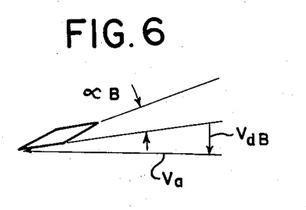
FIG. 6 is a schematic drawing of a blade section of the trailing blade of FIG. 5.

Considering first the effect of pitch-up moment caused by the cross-flow of air passing over the rotor plane and referring to FIGS. 5, 6 and 7, it is seen that air flowing into the rotor plane at a particular spanwise station A on the leading edge of the rotor with respect to the cross-flow $V_a$ has less of a vertical component than air which flows into the rotor plane at an equal spanwise station B on the trailing edge of the rotor. This is because the cross-flow $V_a$ of air passing over the plane of the rotor to the trailing edge has a greater distance to travel whereby it is subjected to induced down-flow of air passing through the rotor plane than is the cross-flow of air passing into the rotor plane at the leading edge.

Referring to FIG. 6, it is seen that the angle of attack at station B on the trailing edge of the rotor is determined by the angle the chord of the blade makes with the direction of resultant air flow which is determined by the cross-flow $V_a$ and the vertical component of flow $V_{dB}$. Similarly, referring to FIG. 7, the angle of attack at station A on the leading edge of the rotor is determined likewise by the angle the chord of the blade at station A makes with the resultant air flow determined by the cross-flow $V_a$ and vertical component of flow $V_{dA}$. Thus it is easily seen that $\alpha_A$ is larger than $\alpha_B$ which, since lift varies directly as angle of attack ($\alpha$), results in a spanwise distribution of lift along the leading and trailing portions of the rotor as shown by the dotted line L' in FIG. 5. This particular spanwise distribution of lift in turn shifts the center of lift of the rotor forward giving a pitch-up moment.

Figures 8, 12, 13, 14:
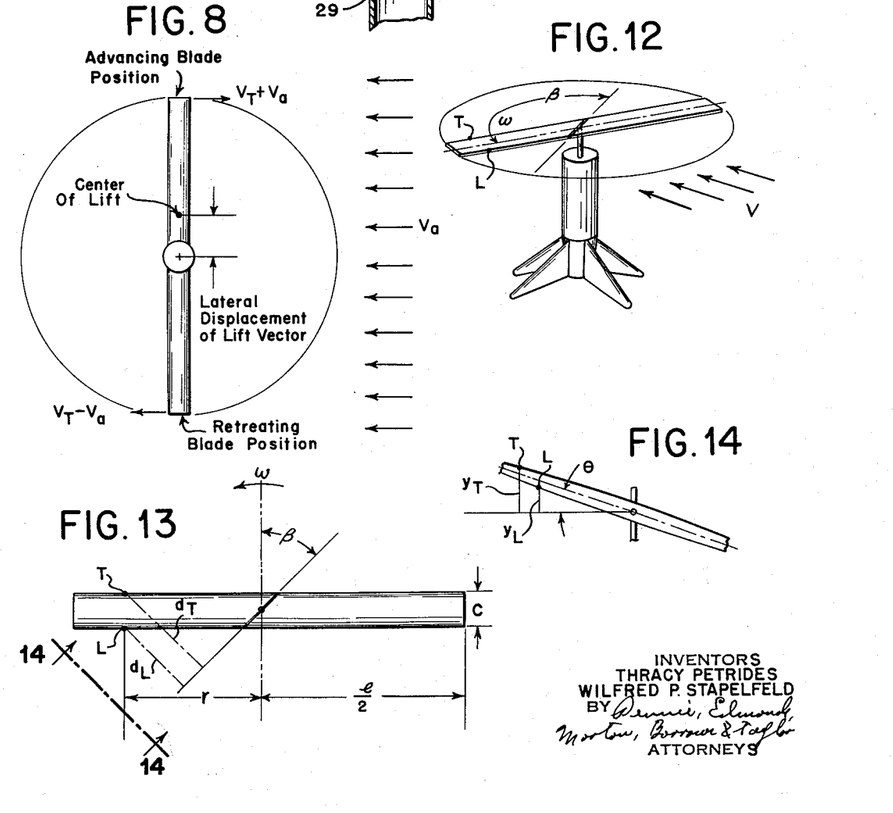
FIG. 8 is a schematic drawing of a plan view of a rotor as illustrated in FIG. 5.
FIG. 12 is a schematic perspective view of a platform similar to that shown in FIG. 5.
FIG. 13 is a schematic plan view of FIG. 12.
FIG. 14 is a side view of the rotor shown in FIG. 13 taken along lines 14—14.

Considering the effect on rolling moment caused by cross-flow of air relative to the rotor plane, reference is now made to FIG. 8, which illustrates a plan view of a rotor plane with reference to a cross-flow of air $V_a$. It is easily seen that where the rotor has a tip speed of $V_T$ that the relative speed of an advancing blade with respect to the cross-flow will be $V_T + V_a$ while that of a retreating blade will be $V_T - V_a$. The result is that air flow over the advancing blade will be greater giving that blade a greater spanwise lift distribution than the retreating blade which will cause a lateral shift in center of lift which in turn will give a rolling moment to the platform in a plane at right angles to the relative cross-wind vector.

The sum of the above-described effects is a combined forward and lateral shift in the center-of-lift of the rotor which heretofore for platforms which had blades which were not cyclically controlled resulted in platforms having marginal stability. However, conventional cyclically controlled rotor blades which change pitch with respect to the hub and which are operating at high supersonic tip speeds on the order of Mach 2.2 are impractical because of the massive bearing structure needed and which is required to withstand the high centrifugal forces imposed on the hub by the blades.

It is known in the art, however, that the dynamic response of a hovering platform having a desirable high speed lifting rotor without cyclic pitch control to a given corrective or control force applied in a given direction is that the platform will move in a spiral path rather than move in the direction in which the control force is applied. This is due to the gyroscopic force of the fast rotating heavy rotor. This adverse effect on maneuverability and stability can be alleviated in part by utilizing interlinking controls and applying the control force, not in the direction in which the platform is to be moved, but rather in the direction which is calculated to produce a maneuver of the platform in the desired direction. Such interlinking controls, however, are necessarily complicated and not entirely feasible since it is desirable in the construction of hovering platforms to avoid control complexity. Also it is desirable to avoid sluggish maneuver response associated with heavy high speed rotors which because of their high rotational inertia are slow to respond to a control force.

Figure 9:
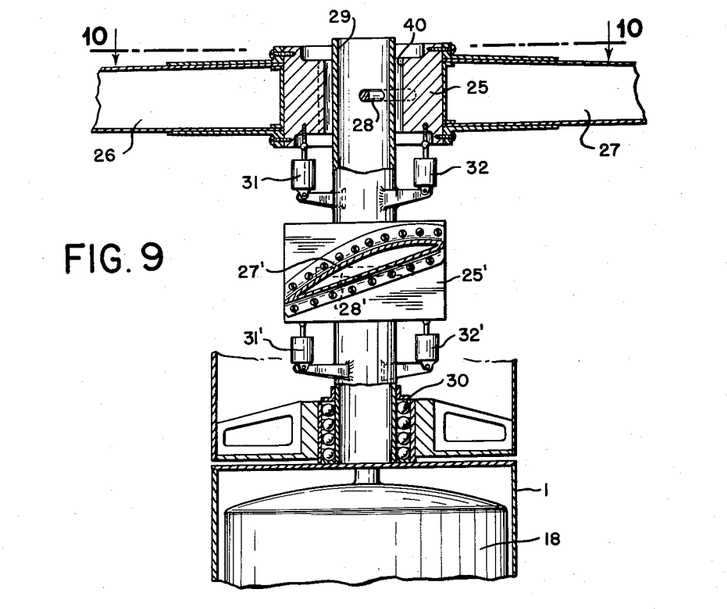
FIG. 9 is an enlarged cross-sectional view of a portion of the platform of FIG. 1 illustrating the hub construction.
Figure 10:
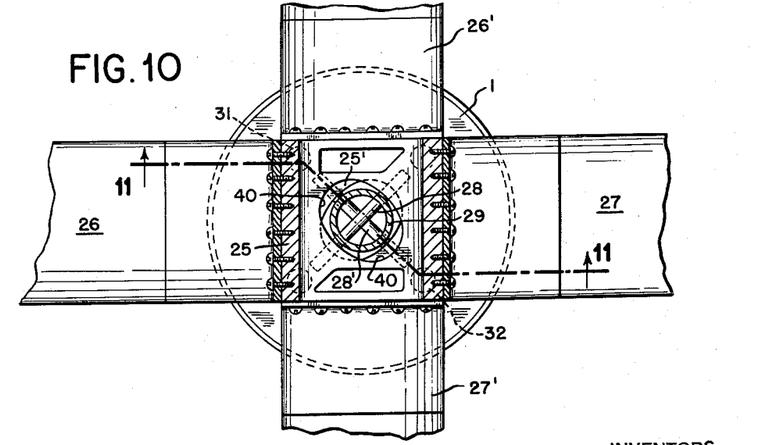
FIG. 10 is a plan view of FIG. 9 taken along lines 10—10.
Figure 11:
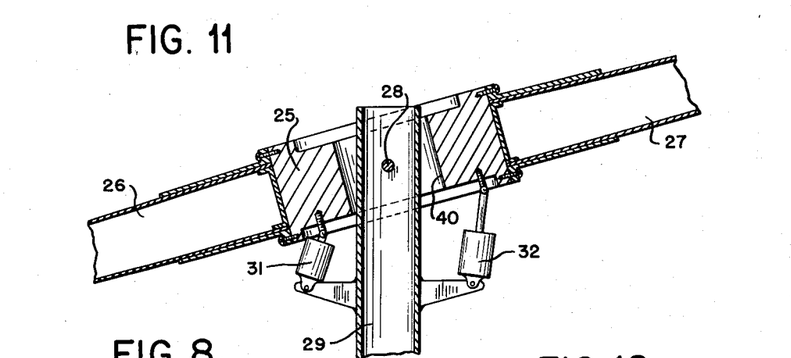
FIG. 11 is a sectional view of FIG. 10 taken along lines 11—11.

We overcome the aforementioned difficulties inherent in heavy high speed rotors having blades rigidly fixed to a hub by providing for a tilting rotor construction as shown in FIGS. 9, 10 and 11. Referring in particular to FIG. 9, there is illustrated an upper rotor hub 25 to which are fixedly mounted on opposite sides thereof blades 26 and 27. A lower rotor hub 25' has fixedly mounted thereon blades 26' and 27' which are similar in construction to the blades and hub comprising the upper rotor. The hub 25 is journalled about a skew pin 28 which in turn is mounted in rotatable shaft 29 and has an elliptical shaped bore 40 through which the shaft extends. The skew pin 28 is inclined approximately 45° with respect to the longitudinal axis of the blades 26 and 27. Shaft 29 in turn is carried by a thrust bearing assembly 30 which is mounted on the body portion 1 of the platform of FIG. 1 so that it is freely rotatable therewith.

Damping pots 31 and 32 which are conventional in construction are mounted on the shaft 29 at one of their ends and are connected to the hub 25 at the other of their ends in order to dampen the movement of the hub 25 about the pin 28. The amount that the hub and blades may tilt is clearly illustrated in FIG. 11 and is on the order of 15° although the precise amount may vary with the design requirements of the hovering platform.

Utilizing the construction of a hub and attached blades as shown in FIGS. 9, 10 and 11, it is seen that the hub may be made of maximum strength in order to overcome the high centrifugal forces existing when the rotor is rotated with tip speeds of Mach 2.2. The hub and two attached blades are in effect one rigid unit which is tiltable about the skew pin 28.

Fuel may be carried through fuel lines extending from the fuel cell 18 and passing through the shaft 29 and the blades to the tip-mounted ramjets. While the fuel lines are not shown, their placement is merely a matter of design engineering. The rotating blades themselves will exert centrifugal force on the fuel in the fuel lines and thus force the fuel to the tip-mounted ramjets and eliminate the necessity of complicated fuel pumping apparatus. The blades 26 and 27 may have at their inner root connected to the hub a subsonic airfoil section on the order of 9–15% thickness ratio while their outer tips have a supersonic airfoil section on the order of 1–3% thickness ratio with the thinner thickness gradually extending to a larger thickness towards the root in order that the outer surface of the blade will have a smooth appearance.

Roll tabs 41 may be mounted on the control surfaces to compensate for friction torque exerted on the body 1 by the rotor through the bearing 30 to provide roll controll for the platform.

In the configuration shown in FIGS. 9, 10 and 11 any inequality in air load between the blades on either side of the hub will result in a relieving action whereby the blades and hub will tilt about the skew pin 28. Since the pin is skewed with respect to the longitudinal axis of the blades, a blade rotation through a positive vertical angle results in a decrease in angle of attack and thus a decrease in lift. This can be seen by reference to FIGS. 12, 13 and 14 by considering what happens to points L and T representing points on the leading and trailing edge of a blade at a given spanwise station when the blade is rotated about the pin. It can be seen that for a given positive vertical rotation (angle $\theta$) about the pin, L and T will move upward in unequal amounts because of the difference in their radii of rotation $d_L$ and $d_T$ as shown in FIG. 13.

Thus L will move upward a distance $y_L$ and T will move upward a distance $y_T$ as shown in FIG. 14. The change in angle of attack may then be calculated as follows:

$$d_L = \left(r \cos B - \frac{C}{2} \sin B\right)$$

$$d_T = \left(r \cos B + \frac{C}{2} \sin B\right)$$

$$y_T - y_L = C \sin B \sin \theta$$

$$\Delta \text{ pitch angle} = \frac{y_T - y_L}{C} = \sin B \sin \theta$$

$\Delta \alpha = \sin B\theta$ is small, where C is the cord of the blade, B the angle of skew of the pin and $r$ the distance of points L and T from the center of the pin.

In addition to the lift relief experienced by the advancing blade because of increasing smaller angles of attack due to the above-described rotation of the advancing blade about the skew pin, there will be an additional reduction in lift which results from the actual upward movement of advancing blade. This is because the upward movement of the blade effectively increases the flow velocity of air through the rotor plane and hence decreases effective angle of attack as explained previously in the explanation of the lift distribution of a rotor when subjected to cross-flow as shown in FIGS. 5, 6 and 7.

In addition to the above-mentioned aerodynamic effects, the skewed tilting rotor utilizes the centrifugal forces existing to reduce the destabilizing moments due to cross-flow. As the tips of the blades rise above or extend below the plane of normal rotor rotation, that is the plane of rotation, when there is no cross-flow and no control forces are being exerted by the control surfaces, the tips of the blades will necessarily rotate about the center of the pin and be brought closer to the vertical axis extending through the center of the rotor plane. Centrifugal force will urge the tip to be pulled away from the vertical axis and thus tend to lower the blade extending above the normal rotor plane and raise the blade extending below the normal rotor plane to bring the blades back to the normal plane of rotation wherein the hub is not tilted with respect to the shaft on which the skew pin is mounted.

Figure 15A:
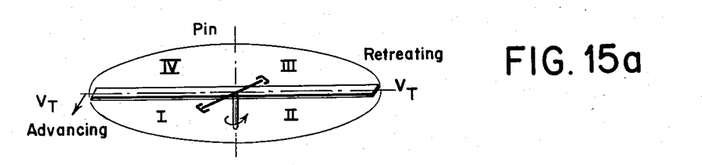
FIGS. 15a–d are schematic views illustrating the various positions the rotor blade takes during a complete revolution.
Figure 15B:
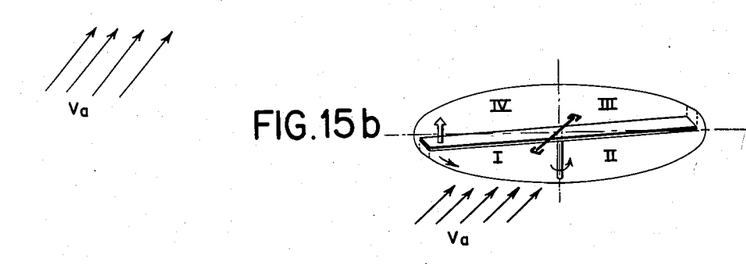
Figure 15C:
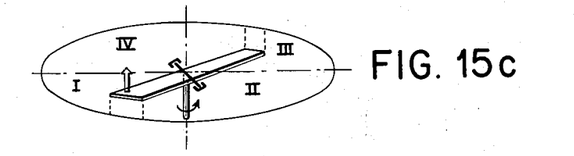
Figures 15D, 15E:
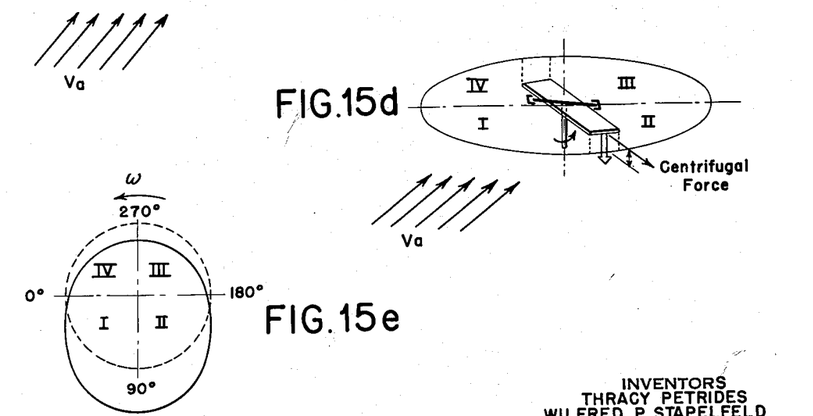
FIG. 15e is a polar diagram illustrating distribution of lift of a rotor constructed according to our invention as compared to a rotor which is not tiltable about a skew pin.

The above effects all tend to reduce the destabilizing moments experienced by a rotor due to crossflow. In general, the effects produce a dynamic time history similar to that illustrated in FIGS. 15a–15d. FIG. 15a illustrates in perspective an advancing blade in a position where it experiences more lift than a retreating blade and where the blades extend perpendicular to the crossflow $V_a$. As explained in the explanation of FIG. 8, the resulting unbalanced movement about the skew hinge results in (1) an upward rotation of the advancing blade about the pin which increases in flow of air into the rotor plane as described in the explanation of FIGS. 5–7; and (2), a rotation displacement of the blade about the skew hinge which decreases its geometric angle of attack as described in the explanation of FIGS. 12–14. Both effects result in a decrease in the net angle of attack of the blade in its "advancing" phase and, hence, tends to reduce lift in the forward quadrants I and II of the rotor plane and thus alleviates the upsetting moment due to cross-flow. The inertia of the blade rocking on the skew pin will cause the peak rocking excursion or upward movement of the blade to occur in the forward quadrants at which time the centrifugal force effect becomes predominant causing a downward movement of the blade and displacement of the blade as shown in FIG. 15d. This downward movement and displacement of the blade has its maximum displacement in the rear quadrants. The result is to increase the net effective angle of attack and, hence, lift in the rear quadrants III and IV thus reducing unfavorable pitching moment of the rotor under cross-flow conditions.

The overall lift experienced by the blades of a tilting rotor is shown in FIG. 15e which is a polar plot with the distribution of lift shown in dotted lines as a function of blade rotation angle as measured in the normal rotor plane from the start of quadrant I. The solid line in FIG. 15e represents lift as a function of blade angle for a rotor having blades rigidly attached to a hub which is not free to tilt about a skew pin. It is seen that the tilting rotor by its unique action tends to equalize lift distribution over the rotor plane with the result that there is less shifting of the center-of-lift under conditions of cross-flow than when using a non-tilting rotor.

We have found by experiments conducted with a small-scale model of a rotor having blades rigidly affixed to a hub which is free to tilt about a skew pin carried by a rotatable shaft, that the destabilizing pitching moment is much less than that of a rotor utilizing blades rigidly fixed to a hub which is not free to tilt about a skew pin.

In addition to reducing rotor pitching moments and, hence, alleviating other critical stabilization problems, a tilting rotor will eliminate undesirable maneuvering response caused by the gyroscopic forces existing in a heavy fast rotating rotor. As mentioned previously, when a non-tiltable heavy high speed rotor is utilized in a hovering platform, gyroscopic forces will result in the platform moving substantially at right angles to the direction in which the control force is applied thus causing the platform to move substantially in a spiral path. The tilting rotor remedies the extraneous gyroscopically-caused maneuver responses of a rigid rotor and, hence, reduces time for completion of a maneuver and control system complications. Thus, when a control force is applied by a control surface to a platform such as that illustrated in FIG. 1 having a tilting rotor, the fuselage or body portion is inclined in the direction of the desired maneuver and is moved in that direction. When the body portion of FIG. 1 is tilted, the rotating rotor will, after a small period of time, also tilt so that its plane of rotation is substantially perpendicular to the longitudinal axis of the body. The time in which it takes the rotor plane to shift so that it is perpendicular to the longitudinal axis of the body may be regulated by the damping pots 31 and 32. This desirable response of the tilting rotor to control or tail forces which are transmitted through the body portion and skew pin to the rotor by the control surfaces, may be seen by reference to FIGS. 16a–16h where the figures illustrate how the tail moment transmitted to the rotor by the skew pin varies during a complete revolution of the rotor.

Figure 16A:
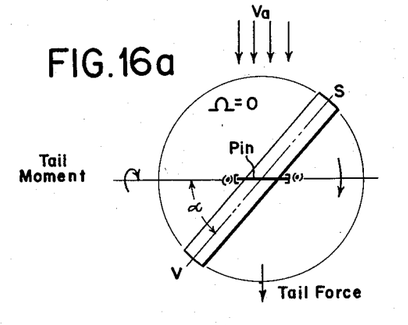
FIGS. 16a–h are schematic views illustrating moments imparted to the rotor during a complete revolution when a tail force is applied to the body portion.
Figure 16B:
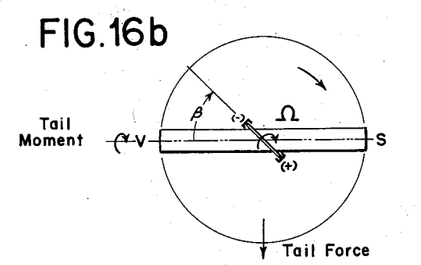
Figure 16C:
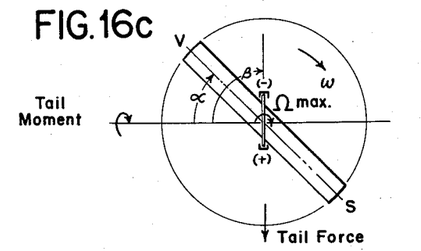
Figure 16D:
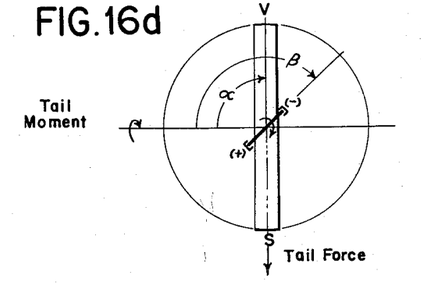
Figure 16E:
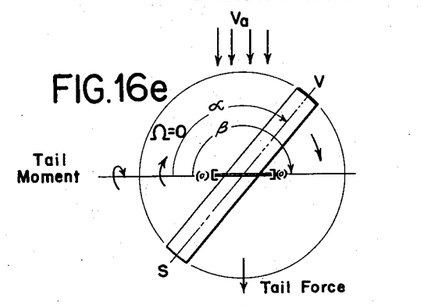
Figure 16F:
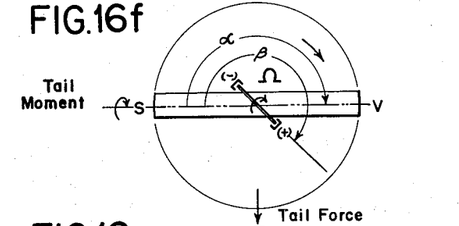
Figure 16G:
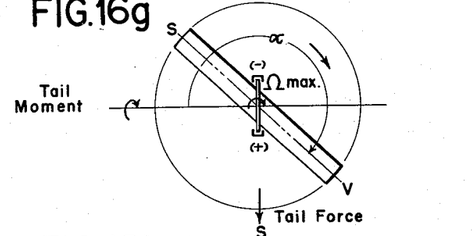
Figure 16H:
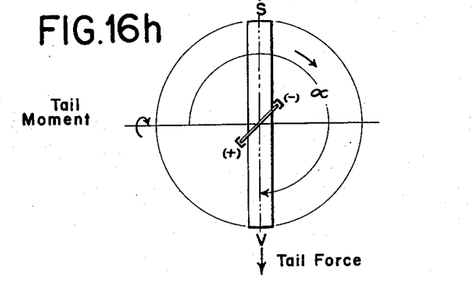

The tail moment applied to the rotor through the skew pin and the resulting angular precession velocity $\Omega$ of the rotor blades about the hinge due to tail moment is zero in the position shown in FIGS. 16a and 16e. When the pin is at right angles to the direction of the tail or control force applied, $\Omega$ is at a maximum when the skew pin is in the position shown in FIGS. 16c and 16g where the direction of tail force applied is parallel to the skew pin. When the rotor is in the position shown in FIG. 16c, the advancing rotor blade V experiences a maximum in upward velocity while retreating blade S experiences a maximum in downward velocity due to tail moment applied. Resultant relative vertical air velocity $V_v$ into the rotor plane increases with respect to blade V and reduces net angle of attack thus reducing lift while the opposite is true for blade S. After the pin passes the position where no control moment can be transmitted as shown in FIG. 16e, the angular precision velocity $\Omega$ increases with an opposite effect on blade V and blade V now experiences a downward velocity $V_v$ and hence increases lift. The variation of this vertical blade velocity is plotted in FIG. 17a $V_v$ for an entire revolution of a blade and FIG. 17a also shows the variation of geometrical angle of attack which occurs in the blade due to the tilting about the skew pin as previously described in the explanation of FIGS. 13 and 14.

Figure 17A:
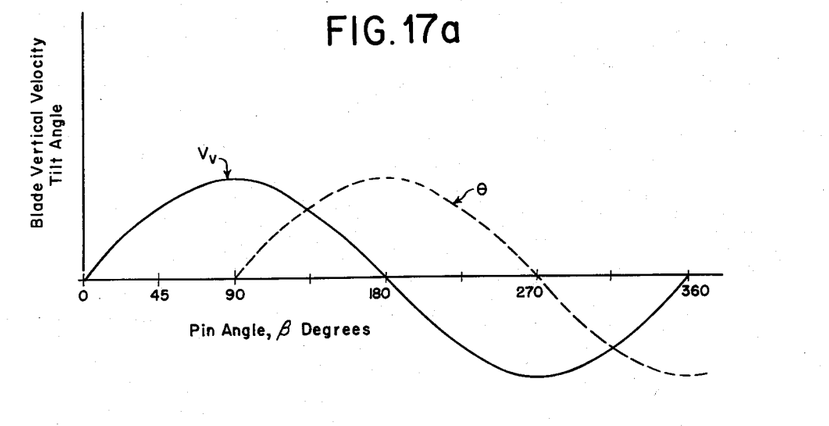
FIG. 17a is a graph comparing blade vertical velocity and tilt angle with respect to angle of rotation of the skew pin.
Figure 17B:
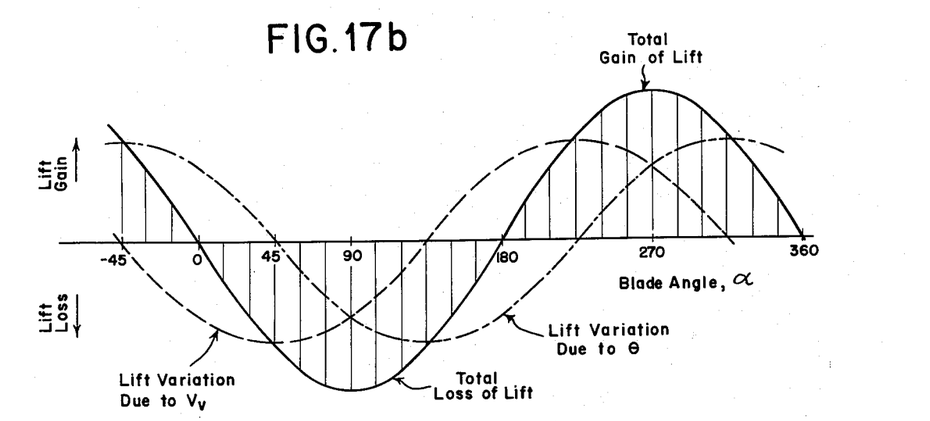
FIG. 17b is a graph illustrating net lift gain and loss as a function of angle of blade rotation about the vertical axis of the rotor plane.

It is seen in FIG. 17a that the peak vertical movement $\theta$ of the blade with respect to the normal rotor plane perpendicular to the shaft will lag the blade vertical velocity function by 90°. Assuming that the position of the longitudinal axis of the blade is 45° behind the skew pin, the net effect on lift caused by change in $V_v$ and $\theta$ can be plotted for an entire revolution as shown in FIG. 17b.

It is to be remembered that positive $V_v$ and $\theta$ result in loss of lift and that negative $V_v$ and $\theta$ result in a net gain in lift. Adding the two effects it is quite clear that there is a loss of lift in quadrants I and II and a gain in lift in quadrants III and IV where the quadrants are the same as shown in FIG. 15e. This reduction of lift in quadrants I and II and increase in quadrants III and IV will rotate the rotor plane in the desired direction, i.e. in the direction in which the tail or control force would tip a rigid non-tilting rotor if there were no gyroscopic effects present. Thus, it is seen that a rotor tiltable about a skew pin eliminates adverse response due to gyroscopic effects and uses gyroscopic precession to oscillate the blade so that lift is redistributed on the rotor disk in order that the disk be rotated by these redistributed aerodynamic forces in the desired direction—in response to tail forces exerted by control surfaces immersed in rotor downwash.

It is thus seen that the disclosed skewed tilting rotor construction: (1) Significantly reduces the destabilizing pitching moment experienced by conventional rigid rotors under cross-flow conditions resulting from cross-winds or lateral translation of the vehicle, and, (2) eliminates the undesirable, extraneous maneuver response of a rigid rotor due to gyroscopic forces, and instead uses gyroscopic forces to move the blade so that the resulting aerodynamic forces rotate the plane of the rotor such that translation in the desired direction takes place.

While we have disclosed the above-described rotor tiltable about a skewed pin wherein the rotor is rotated so that its tip speeds are supersonic, it is apparent the novel rotor has further uses and may be applied to aircraft having subsonic tip speeds provided that the rotor has sufficient mass and rotational velocity to make gyroscopic forces appreciable.

Figure 18:
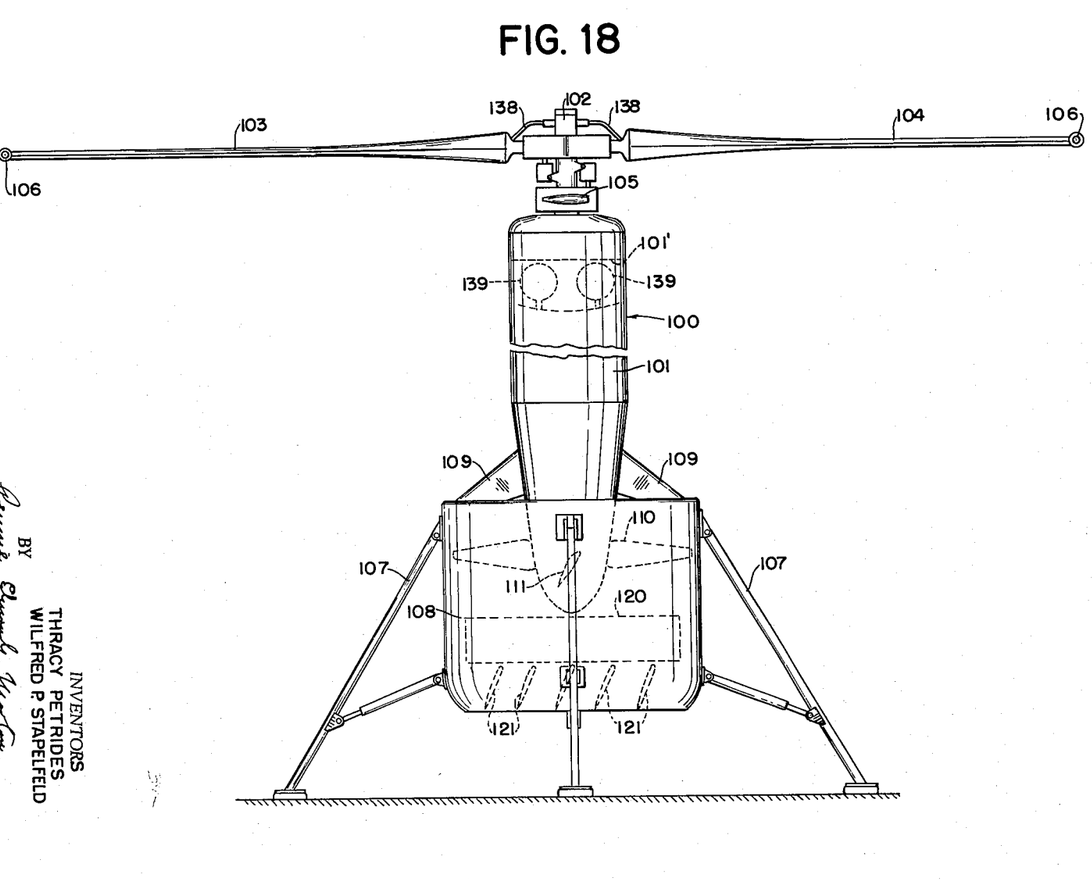
FIG. 18 is a partial side view of a different embodiment of the invention illustrated in FIG. 1.
Figure 19:
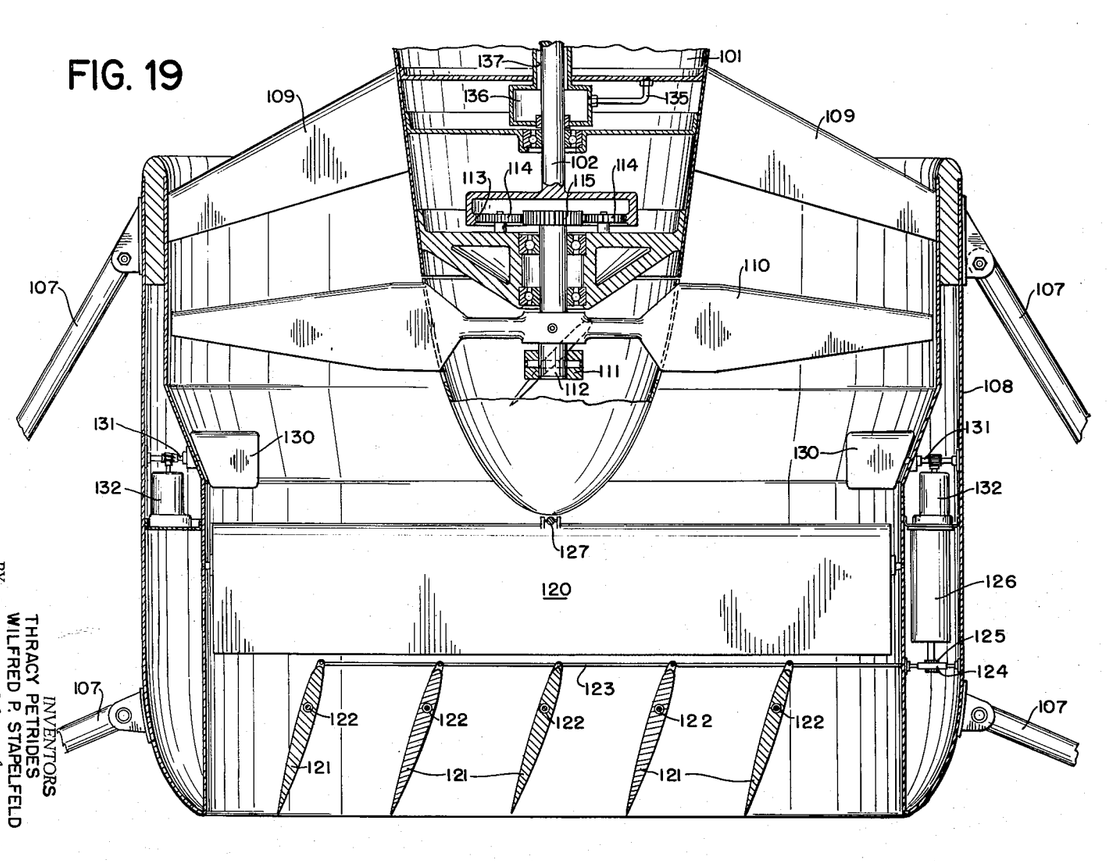
FIG. 19 is an enlarged partial sectional view of FIG. 1, illustrating the control surfaces.

Referring to FIGS. 18 and 19, there is illustrated a different embodiment of a supersonic rotary wind hovering platform from that shown in FIG. 1. 100 denotes generally a platform body comprising a tank member 101 through which a rotatable shaft 102 extends. An upper rotor assembly having two oppositely disposed blades 103 and 104 and a lower rotor assembly 105 also having two oppositely disposed blades are mounted on the shaft in the same manner as illustrated in FIGS. 9 and 10. Hydrogen peroxide rocket motors 106 are mounted on the tips of the blades to provide propulsive force.

A landing gear 107 is mounted to a shroud 108 which in turn surrounds and is mounted to the tank number by means of struts 109. Control rotor assemblies 110 and 111 are mounted on a shaft 112 which in turn is rotatably driven by means of rotatable shaft 102 through speed increasing planetary gears 113, 114 and 115. The blades of the control rotor assembly are of supersonic air foil section so that when the shaft 102 is rotated by the rocket motors 106, the rotor assemblies 110 and 111 will rotate at supersonic tip speeds and so cause air to flow into the upper part of the shroud 108 and out of the lower part. Yaw control vanes 120 and pitch control vanes 121 are included in the shroud so that when they are moved, they will provide yaw and pitch control to supplement the control provided by the main rotor assembly as previously described. The vanes 121 are mounted for rotation about point 122 and are rotated by means of a rod 123 connected to the ends of the vanes. Rod 123 in turn is connected to a rack 124 which meshes with a spur gear 125 driven by a servo motor 126. The yaw control vanes are similarly connected by a rod 127 which in turn connects with a yaw servo motor not shown.

Roll control vanes 130 are mounted on shafts 131 and in turn are differentially rotated by means of roll control servo motors 132 to provide roll control for the hovering platform. The various servo motors may be controlled by gyroscopic devices, not shown, carried in an instrument package section 101' mounted on the hovering platform 100 or controlled directly from the ground by radio impulses.

The tank portion 101 serves as a fuel tank to carry the hydrogen peroxide fuel. The fuel is forced from the bottom of the tank through a passage 135 into a manifold section 136, through the main propeller feed line 137, and into fuel lines 138 which run to the rocket pressure bottles 139 in order to force it up through the main propeller feed line 137 and out through the subsidiary feed line 138.

The advantage of the construction of the invention as shown in FIGS. 18 and 19 is that a more positive control is maintained when the platform is subjected to a side wind. When the platform of FIG. 1 is subject to a side wind gust, forces due to the wind load are applied directly to the control surfaces 10—13 whereas in the construction shown in FIG. 18, the controls are only subjected to the air flow passing through the shroud and notwithstanding side wind effect.

We claim:

1. A rotary wing assembly for a hovering platform comprising a rotatable shaft, a hub, two relatively heavy blades rigidly affixed to said hub on diametrically opposite sides thereof, said blades comprising a substantial part of the total weight of said platform and each said blade having an outer spanwise portion of a supersonic airfoil sectoin, a skew pin carried by said shaft extending normal to the longitudinal axis of said shaft and skew to the longitudinal axis of said blades, said hub being journalled to said pin, and propulsion units affixed to the outer tips of said blades; the spanwise mass of said blades when rotated providing a stabilizing force to cause the plane of rotation of said blades to return to a substantially perpendicular position with respect to said shaft when said shaft and plane have been tilted with respect to one another.

2. A rotary wing assembly according to claim 1 wherein said propulsion units are ramjets.

3. A supersonic rotary wing platform comprising a platform body symmetrical about a vertical axis, a shaft rotatably mounted on said body and concentric with said vertical axis, a skew pin carried by said shaft and extending normal to said vertical axis, a hub journalled to said pin, relatively heavy lifting blades rigidly mounted on said hub on diametrically opposite sides thereof with their longitudinal axes skew to the longitudinal axis of said skew pin, said lifting blades having supersonic airfoil sections on their outer ends and forming a substantial part of the total weight of said platform, ramjets mounted on the outer tips of said blades and control airfoil means mounted on said body in the area of downwash when said lifting blades and rotor are rotated by said ramjets; the spanwise mass of said blades providing a stabilizing force when said blades are rotated to cause the plane of rotation of said blades to return to a substantially perpendicular position with respect to said shaft after said shaft and plane have been tilted with respect to one another.

4. A supersonic rotary wing platform according to claim 3 wherein said control airfoils have rotation control means thereon wherein rotation of said body with respect to rotation of said lifting blades may be regulated.

5. A high altitude hovering device for providing a stable platform in the stratosphere at a predetermined altitude above a reference plane comprising a body portion, a substantially vertical shaft rotatably carried by said body portion, a plurality of relatively heavy lifting blades, at least one hub to which some of said blades are rigidly connected on diametrically opposite sides, pin means connecting each said hub to said shaft whereby each hub may tilt about its associated pin means and whereby said associated pin means is inclined to the longitudinal axis of lifting blades mounted on its associated hub, each said blade comprising an outer spanwise portion having a supersonic airfoil section and an inner spanwise root portion of subsonic airfoil section, and propulsion means mounted on the outer tips of said blades for rotating said blades at a tip speed in excess of Mach 1.5 about said shaft; the spanwise mass of said blades providing a stabilizing force when said blades are rotated to cause the plane of rotation of said blades to return to a substantially perpendicular position with respect to said shaft after said shaft and plane have been tilted with respect to one another.

6. A high altitude hovering device according to claim 5 wherein said body has control surfaces mounted thereon in the downwash of said rotatable blades for maintaining longitudinal, lateral, and roll stability of said device.

7. A high altitude hovering device according to claim 6 having in addition thrust control means responsive to change in altitude for varying the thrust of said propulsion means in order to control the rotational speed and subsequent lifting force of said blades.

8. A high altitude hovering device according to claim 7 having in addition control servo-mechanisms responsive to command signals for moving said control surfaces to maintain said device in a predetermined area.

9. A high altitude hovering device according to claim 5 having in addition damping means for damping tilt of each said hub and attached blades about said pin means whereby said damping means controls the rate of application of said stabilizing force caused by the spanwise mass of said blades.

10. A guided and automatic control rotary wing vertical takeoff and hovering aircraft adapted to provide a relative stable platform in and below the stratosphere with a desired altitude range above a reference position comprising a body portion being substantially symmetrical about its longitudinal axis, said body being arranged with its longitudinal axis disposed vertically, a bearing arrangement at the upper end of said body and supported thereby at said axis, at least one hub rotatably mounted on said bearing, two substantially identical conformed blades rigidly fixed to each said hub at diametrically opposite sides thereof and providing a lifting rotor for the aircraft, the conformity of each of said blades providing an outer portion of supersonic airfoil section and an inner root section of subsonic airfoil section, a ramjet type motor mounted on the outer tip of each said blade with its longitudinal axis disposed at a substantial angle to the longitudinal axis of said blade and adapted to rotate the blade at supersonic blade tip speeds of the order of Mach 2, a plurality of air dynamic control surfaces symmetrically disposed about and affixed to said body in the downwash of said blade adapted to provide pitch, yaw and roll stabilization of said aircraft during vertical descent and hovering; the spanwise mass of said blades providing a stabilizing force when said blades are rotated to cause the plane of rotation of said blades to return to a substantially perpendicular position with respect to said shaft after said shaft and plane have been tilted with respect to one another.

11. An aircraft according to claim 10 having in addition radar beam receiving antenna and microwave command guidance receiver apparatus including servo-mechanisms actuated by signal outputs from said receiver apparatus carried by said body portion, said servo-mechanisms being coupled to certain of said control surfaces and adapted to actuate said control surfaces in accordance with said signal outputs to change the heading of said aircraft during ascent and hovering, gyrocontrol servo-mechanisms carried by said body portion and coupled to certain of said control surfaces and adapted to stabilize said aircraft during ascent and hovering whereby said aircraft may be guided and restrained in flight during ascent and hovering along a flight path at substantially the center of a command radar beam propagated vertically from the reference position.

12. A high altitude hovering device for providing a stable platform comprising a body portion being symmetrical about its longitudinal axis, a rotatable shaft carried by said body portion concentric with said longitudinal axis, at least one hub tiltably mounted on a pin carried by said shaft and extending normal to said longitudinal axis, two blades rigidly affixed to each said hub on diametrically opposite sides thereof and with their longitudinal axes inclined to said pin, the outer portions of each said blade having a supersonic airfoil section, propulsion units mounted on the tip of each said blade whereby said blades and affixed hub may be rotated in excess of Mach 1, control surfaces symmetrically mounted on said body in the area of downwash from said rotatable blades and gyrocontrolled servo-mechanisms carried by said body to move said control surfaces to stabilize said aircraft; said hub and attached blades being effectively uncoupled from said body when a destabilizing force acts on said rotating blades, and the plane of rotation of said blades rotating after the longitudinal axis of said body portion has been inclined to a position where it is perpendicular to said shaft.

13. A supersonic rotary wing platform comprising a platform body symmetrical about a vertical axis, a shaft rotatably mounted on said body and concentric with said vertical axis, a skew pin mounted on the upper end of said shaft and extending normal to said vertical axis, a hub journalled to said pin, relatively heavy lifting blades rigidly mounted on said hub with their longitudinal axes skew to the longitudinal axis of said pin, said lifting blades having supersonic airfoil sections on their outer ends, propulsive units mounted on the outer tips of said lifting blades, a control rotor having control blades mounted concentric with and at the opposite end of said shaft than said hub, drive means connecting said control rotor and shaft whereby said control rotor will rotate when said shaft is rotated by said propulsive units, a shroud surrounding and extending below said control rotor, and movable control vanes mounted in said shroud in the downwash of said control blades for imparting yaw, pitch and roll stability to said platform.

14. A supersonic rotary wing platform according to claim 13 wherein said control blades have a supersonic airfoil section at their outer tips and said drive means comprises a speed increasing gear train.

References Cited in the file of this patent

UNITED STATES PATENTS

| | | |
|---|---|---|
| 2,444,781 | Leonard | July 6, 1948 |
| 2,605,608 | Barclay | Aug. 5, 1952 |
| 2,639,776 | Stanley | May 26, 1953 |
| 2,650,667 | Young | Sept. 1, 1953 |
| 2,826,378 | Childs | Mar. 11, 1958 |